(12) United States Patent
Kita et al.

(10) Patent No.: US 6,656,252 B2
(45) Date of Patent: Dec. 2, 2003

(54) POLYMER SEPARATION MEMBRANE

(75) Inventors: Hidetoshi Kita, Yamaguchi (JP); Masato Tabuchi, Osaka (JP); Takaaki Sakai, Osaka (JP)

(73) Assignee: Daiso Co., Ltd., Osaka (JP)

( * ) Notice: Subject to any disclaimer, the term of this patent is extended or adjusted under 35 U.S.C. 154(b) by 0 days.

(21) Appl. No.: 10/225,129

(22) Filed: Aug. 22, 2002

(65) Prior Publication Data

US 2003/0110947 A1 Jun. 19, 2003

(30) Foreign Application Priority Data

Aug. 22, 2001 (JP) ........................................ 2001-251678
Nov. 6, 2001 (JP) ........................................ 2001-340359

(51) Int. Cl.⁷ ........................... B01D 53/22; B01D 71/46; B01D 71/52
(52) U.S. Cl. ........................... 96/4; 95/50; 95/51; 96/14
(58) Field of Search ................... 96/4, 12–14; 55/524, 55/DIG. 5; 95/45, 50, 51

(56) References Cited

U.S. PATENT DOCUMENTS

| | | | |
|---|---|---|---|
| 4,613,440 A | * 9/1986 | Zupancic et al. | 210/490 |
| 4,627,859 A | * 12/1986 | Zupancic et al. | 96/13 |
| 4,644,046 A | * 2/1987 | Yamada | 96/14 |
| 4,747,953 A | * 5/1988 | Zupancic et al. | 210/651 |
| 4,758,251 A | * 7/1988 | Swedo et al. | 95/54 |
| 4,964,890 A | * 10/1990 | Reuter et al. | 96/14 |
| 5,030,252 A | * 7/1991 | Sanders et al. | 95/47 |
| 5,034,034 A | * 7/1991 | Sanders et al. | 96/10 |
| 5,073,176 A | * 12/1991 | Arthur | 95/54 |
| 5,080,698 A | * 1/1992 | Krizan | 96/14 |
| 5,102,552 A | * 4/1992 | Callahan et al. | 210/654 |
| 5,156,656 A | * 10/1992 | Parker et al. | 95/53 |
| 5,209,848 A | * 5/1993 | Jeanes et al. | 210/490 |
| 5,248,319 A | * 9/1993 | Ekiner et al. | 95/54 |
| 5,409,524 A | * 4/1995 | Jensvold et al. | 96/8 |
| 5,576,057 A | * 11/1996 | Hirose et al. | 427/245 |
| 5,837,157 A | 11/1998 | Kohjiya et al. | |
| 6,368,382 B1 | * 4/2002 | Chiou | 95/49 |

FOREIGN PATENT DOCUMENTS

| | | |
|---|---|---|
| JP | 59-182844 | 10/1984 |
| JP | 60-150806 | 8/1985 |
| JP | 61-133106 | 6/1986 |
| JP | 63-123420 | 5/1988 |
| JP | 63-154736 | 6/1988 |
| JP | 6-71148 | 3/1994 |
| JP | 8-24602 | 1/1996 |
| JP | 8-332362 | 12/1996 |
| JP | 9-324114 | 12/1997 |
| JP | 11-345628 | 12/1999 |

OTHER PUBLICATIONS

Kawakami et al., The Chemical Society of Japan, pp. 847–853 (1983)—English abstract is included on p. 853.
Koros et al., Progress in Polymer Science, vol. 13, pp. 339–401 (1988).

* cited by examiner

Primary Examiner—Robert H. Spitzer
(74) Attorney, Agent, or Firm—Wenderoth, Lind & Ponack, L.L.P.

(57) ABSTRACT

A separation membrane comprising a polyether polymer having a weight-average molecular weight of $10^4$ to $10^7$ and obtained by polymerizing an oxirane compound of the formula (a):

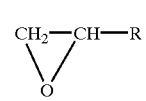

(a)

wherein R is a hydrogen atom;
an alkyl group, an alkyl group having a halogen atom, or $-CH_2O(CH_2CH_2O)_k-R'$ (R' is a group selected from an alkyl group, an alkenyl group, a cycloalkyl group, an aryl group and an aralkyl group; k is from 0 to 12); or
an ethylenically unsaturated group, a reactive silicon-containing group or a methylepoxy-containing group, is excellent in mechanical strength and flexibility.

10 Claims, No Drawings

POLYMER SEPARATION MEMBRANE

FIELD OF THE INVENTION

The present invention relates to a gas separation membrane used for separating a gas from a mixture of various gases. Particularly, the gas separation membrane of the present invention is excellent in permeation of especially a carbon dioxide gas and various hydrocarbon gases. Therefore, the gas separation membrane of the present invention is suitable as a gas separation membrane which separates a carbon dioxide gas from a carbon dioxide-containing gas mixture comprising the carbon dioxide gas and other gases (for example, a nitrogen gas and/or air and/or a hydrogen gas), or as a gas separation membrane which separates a hydrocarbon gas from a hydrocarbon-containing gas mixture comprising the hydrocarbon gas and other gases (for example, a nitrogen gas and/or air and/or a hydrogen gas).

RELATED ARTS

Hitherto, gas separation membranes comprising various polymeric materials such as cellulose acetate, silicone rubber, polysulfone and polyamide are well-known. These well-known gas separation membranes are practically used in various fields. However, these gas separation membranes are not practical membranes, because a separation coefficient of carbon dioxide to nitrogen is low, at most 10 as a separation membrane for carbon dioxide which is deemed to be responsible for global warming, and the membrane is plasticized with carbon dioxide to decrease the separation coefficient. A gas separation membrane comprising an aromatic polyimide is also known (JP-A-60-150806; JP-A-61-133106; JP-A-63-123420; and JP-A-8-332362). Although the separation coefficient of carbon dioxide to nitrogen in these polyimide gas separation membranes is relatively high, from 20 to 40, these membranes do not have sufficiently high efficiency. In addition, since these membranes are made from the aromatic polyimide, the cost also is problematic.

Apart from the above, a gas separation membrane, in which a porous membrane is impregnated with polyethylene glycol or a polymer is blended or copolymerized with another polymer, is proposed (Bulletin of Chemical Society of Japan, pages 847–853, 1983; JP-A-6-71148; and JP-A-8-24602). Although these separation membranes exhibit a high separation coefficient of 50 to 100, these separation membrane can not be practically used because of a low permeation coefficient, poor membrane productivity, and poor membrane stability giving gradual membrane property deterioration. A silicone rubber is proposed as a membrane for separating carbon dioxide from a mixture of carbon dioxide and hydrogen, but this membrane has a separation coefficient of about 5 so that the separation efficiency is low. Conventional polymer membranes as the membrane for separating hydrocarbon gas have problems of chemical instability due to plasticization.

A separation membrane comprising polyepichlorohydrin is also proposed (Progress in Polymer Science, 13, 339–401 (1988)). However, disadvantageously, polyepichlorohydrin has high crystallinity and has a low permeation coefficient of the separation membrane.

SUMMARY OF THE INVENTION

An object of the present invention is to provide a separation membrane having a high permeation coefficient of gases, and a high separation coefficient.

The present inventors intensively studied, discovered that a polyether polymer obtained from an oxirane compound is useful for a gas separation membrane, and completed the present invention. The gas separation membrane of the present invention is suitable for separating one gas from a gas mixture comprising at least two gases. The polymer gas separation membrane of the present invention can be a gas separation membrane having high selectivity, particularly high selective permeability of a $CO_2$ gas and a hydrocarbon gas, and stability for long term.

DETAILED DESCRIPTION OF THE INVENTION

The present invention provides a separation membrane comprising a polyether polymer having a weight-average molecular weight of $10^4$ to $10^7$ and obtained by polymerizing an oxirane compound of the formula (a):

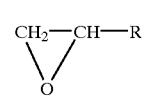

(a)

wherein R is a hydrogen atom;
an alkyl group, an alkyl group having an halogen atom, or —$CH_2O(CH_2CH_2O)_k$—R' (R' is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atoms; k is from 0 to 12); or
an ethylenically unsaturated group, a reactive silicon-containing group or a methylepoxy-containing group.

The present invention provides a separation membrane comprising a polyether polymer having a weight-average molecular weight of $10^4$ to $10^7$ and obtained by polymerizing an oxirane compound of the formula (a):

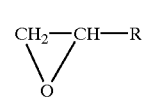

(a)

wherein R is a hydrogen atom;
an alkyl group, an alkyl group having an halogen atom, or —$CH_2O(CH_2CH_2O)_k$—R' (R' is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atoms; k is from 0 to 12); or
an ethylenically unsaturated group, a reactive silicon-containing group or a methylepoxy-containing group, and
a branched-chain ether compound exhibiting liquid properties at normal temperature and selected from the group consisting of the formulas (i), (ii) and (iii):

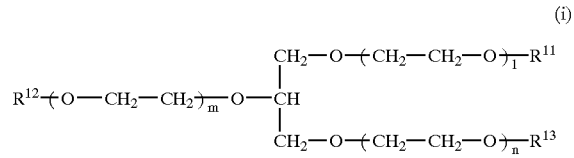

(i)

wherein $R^{11}$, $R^{12}$ and $R^{13}$ are a hydrogen atom, an alkyl group having 1 to 6 carbon atoms or an alkenyl group having 2 to 6 carbon atoms; l, m and n are from 0 to 12 (provided that all of l, m and n are not simultaneously 0), (ii)

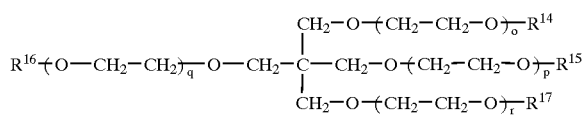

wherein $R^{14}, R^{15}, R^{16}$ and $R^{17}$ are a hydrogen atom, an alkyl group having 1 to 6 carbon atoms or an alkenyl group having 2 to 6 carbon atoms; o, p, q and r are from 0 to 12 (provided that all of o, p, q and r are not simultaneously 0), (iii)

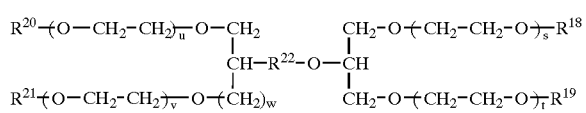

wherein $R^{18}, R^{19}, R^{20}$ and $R^{21}$ are a hydrogen atom, an alkyl group having 1 to 6 carbon atoms or an alkenyl group having 2 to 6 carbon atoms; s, t, u and v are from 0 to 12 (provided that s, t, u and v are not simultaneously 0); $R^{22}$ is a methylene group or $—(OCH_2CH_2)_x—$ (x is from 0 to 12); and w is 0 or 1.

The separation membrane of the present invention may be made of a copolymer comprising at least two oxirane compounds (a)

Particularly, the oxirane compound (a) can be classified into the following monomer (1), monomer (2) and monomer (3).

(1)

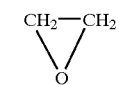

(2)

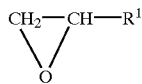

(3)

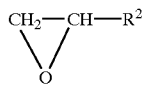

In the above formula (2), $R^1$ is an alkyl group, an alkyl group containing a halogen atom, or $—CH_2O(CH_2CH_2O)_k—R'$. The number of carbon atoms in the alkyl group and the alkyl group containing the halogen atom is preferably from 1 to 12, for example, from 1 to 8, particularly from 1 to 3. R' is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atoms. k is from 0 to 12, for example, from 0 to 6.

In the formula (3), $R^2$ is an ethylenically unsaturated group, a reactive silicon-containing group, a methylepoxy-containing group or an alkyl group containing a halogen atom.

In the copolymer comprising both of monomer (2) and monomer (3), the monomer (2) and the monomer (3) are not the same compound.

Preferably, the monomers constituting the copolyether polymer are:

(i) a combination of the monomers (1) and (2),
(ii) a combination of the monomers (1) and (3),
(iii) a combination of the monomers (1), (2) and (3), or
(iv) a combination of the monomers (2) and (3).

The polyether polymer may be constituted by the following repeat units of the formulas (4), (5) and (6) derived from each of the monomers (1), (2) and (3).

(4)

(5)

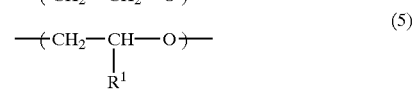

(6)

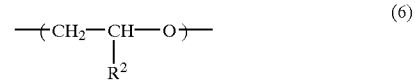

It is known that a polyether copolymer of ethylene oxide of the formula (1) and an oxirane compound comprising the oligooxyethylene group of the formula (2) (JP-A-9-324114) and a crosslinked material of a polyether copolymer of oxirane compounds comprising said copolymerizable monomers and a crosslinkable oxirane compound of the formula (3) having an unsaturated group, a reactive silicon group or an epoxy group (JP-A-59-182844; and JP-A-11-345628) can be combined with an electrolyte to give a polymer solid electrolyte. However, these documents do not describe the permeation and separation of gas.

[Component of the Formula (2)]

Examples of the oxirane compound containing the halogen atom of the formula (2) are epichlorohydrin, epibromohydrin and epiiodohydrin.

[Component of the Formula (3)]

A reactive functional group in the formula (3) is preferably (a) an ethylenically unsaturated group, (b) a reactive silicon group, or (c) a methylepoxy group.

Examples of the oxirane compound containing the ethylenically unsaturated group include allyl glycidyl ether, 4-vinylcyclohexylglycidyl ether, α-terpinyl glycidyl ether, cyclohexenylmethylglycidyl ether, p-vinylbenzylglycidyl ether, allylphenylglycidyl ether, vinylglycidyl ether, 2-vinyloxyethylglycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbinate, glycidyl cinnamate, glycidyl crotonate and glycidyl 4-hexenoate. Allyl glycidyl ether, glycidyl acrylate and glycidyl methacrylate are preferable.

Examples of the oxirane compound containing the reactive silicon group include 2-glycidoxyethyltrimethoxysilane, 3-glycidoxypropylmethyldimethoxysilane, 3-glycidoxypropyltrimethoxysilane, 4-glycidoxybutylmethyltrimethoxysilane, 3-(1,2-epoxy) propyltrimethoxysilane, 4-(1,2-epoxy) butyltrimethoxysilane, 5-(1,2-epoxy) pentyltrimethoxysilane, 1-(3,4-epoxycyclohexyl)-methylmethyldimethoxysilane and 2-(3,4-epoxycyclohexyl)-ethyltrimethoxysilane.

Examples of the oxirane compound containing the terminal methylepoxy group include 2,3-epoxypropyl-2',3'-epoxy-2'-methylpropylether, ethylene glycol-2,3-epoxypropyl-2',3'-epoxy-2'-methylpropylether, diethylene glycol-2,3-epoxypropyl-2',3'-epoxy-2'-methylpropylether, 2-methyl-1,2,3,4-diepoxybutane, 2-methyl-1,2,4,5-diepoxypentane, 2-methyl-1,2,5,6-diepoxyhexane, hydroquinone-2,3-epoxypropyl-2,3'-epoxy-2'-methylpropylether, and catechol-2,3-epoxypropyl-2',3'-epoxy-2'-methylpropylether.

With respect to a polymerization method of the polyether polymer (that is, the polyether polymer having or free of the side chain containing the crosslinkable reactive group), the monomers are reacted under the presence or absence of a solvent at a reaction temperature of 10 to 80° C. with stirring, using a catalyst system mainly containing organic aluminum, a catalyst system mainly containing organic zinc, an organotin-phosphoric ester condensate catalyst system and the like as a ring-opening polymerization catalyst to give the polyether polymer, as described in JP-A-63-154736. The organotin-phosphoric ester condensate catalyst system is particularly preferable in view of the polymerization degree, properties of the resultant copolymer, and the like.

The polyether polymer according to the present invention may contain ethylene oxide of the formula (1) as the monomer component. It is known that the gas permeability is generally increased by decreasing the crystallinity of polyethylene oxide, but the increase effect of the gas permeability is remarkably high in the case of the polyether polymer according to the present invention. The amount of ethylene oxide may be at most 98% by mol, for example, at most 90% by mol, particularly at most 80% by mol, based on the whole of used monomers. When the amount of ethylene oxide is at most 98% by mol (based on whole of used monomers), a glass transition temperature is low and an oxyethylene chain is noncrystalline, resulting that the gas permeability is good.

The molar ratio of the monomer (2) to the monomer (3) in the polyether polymer is not critical and may be from 80:20 to 100:0, for example, from 90:10 to 100:0.

The polymerization degree, k of oxyethylene unit in the monomer component containing oligooxyethylene of the formula (2) is preferably from 0 to 12, for example, from 0 to 6. When k is at most 12, the crystallization of the oligooxyethylene chain is preferably prevented.

The molecular weight of the polyether polymer suitably has the weight-average molecular weight in the range of $10^4$ to $10^7$, preferably $10^5$ to $5 \times 10^6$ in order to give good processability, shapability, mechanical strength and flexibility. When the weight-average molecular weight is in the above-mentioned range, the resultant gas separation membrane has high permeability, and excellent processability and shapability. The weight-average molecular weight is measured by gel permeation chromatography (GPC) in terms of polystyrene.

The polyether polymer preferably has the glass transition temperature of at most −50° C., and the heat of fusion of crystal of at most 90 J/g. The glass transition temperature and the heat of fusion of crystal are measured by a differential scanning calorimetry (DSC).

The polyether copolymer used in the present invention may be any type of a block copolymer or a random copolymer. The random copolymer is preferable because it has a larger effect of reducing the crystallinity of polyethylene oxide.

[Crosslinking]

The polyether polymer having the ethylenically unsaturated group used in the present invention can be crosslinked by using thermal crosslinking utilizing a radical initiator such as an organic peroxide and azo compound, the crosslinking utilizing an active energy ray such as ultraviolet ray and electron beam, and a hydrosilylation reaction utilizing a crosslinking agent containing silicon hydride.

As the organic peroxide, used are those conventionally used for the crosslinking, such as a ketone peroxide, a peroxyketal, a peroxyketal, a hydroperoxide, a dialkylperoxide, a diacylperoxide and a peroxy ester. Examples of the organic peroxide include 1,1-bis(t-butylperoxy)-3,3,5-trimethylcyclohexane, di-t-butyl peroxide, t-butylcumyl peroxide, dicumyl peroxide, 2,5-dimethyl-2,5-di(t-butylperoxy)hexane and benzoyl peroxide. The amount of the organic peroxide varies depending on the type of the organic peroxide, and is usually in the range of 0.1% by weight to 10% by weight, based on the whole of separation membrane (excluding the branched-chain ether compound).

As the azo compound, used are those conventionally used for the crosslinking, such as an azonitrile compound, an azoamide compound and an azoamidine compound. Examples of the azo compound include 2,2'-azobisisobutyronitrile, 2,2'-azobis(2-methylbutyronitrile), 2,2'-azobis(4-methoxy-2,4-dimethylvaleronitrile), 2,2'-azobis (2-methyl-N-phenylpropionamidine) dihydrochloride, 2,2'-azobis[2-(2-imidazolin-2-yl)propane], 2,2'-azobis[2-methyl-N-(2-hydroxyethyl)propionamide], 2,2'-azobis(2-methylpropane) and 2,2'-azobis[2-(hydroxymethyl)propionitrile]. The amount of the azo compound varies depending on the type of the azo compound, and is usually in the range of 0.1% by weight to 10% by weight, based on the whole of separation membrane (excluding the branched-chain ether compound).

The monomer component of the formula (3) suitable for the crosslinking by ultraviolet ray, electron beam and the like is preferably glycidyl acrylate ester, glycidyl methacrylate ester and glycidyl cinnamate ester. The use of a sensitizing aid is particularly preferable. Non-limiting examples of the sensitizing aid are acetophenones such as diethoxyacetophenone, 2-hydroxy-2-methyl-1-phenylpropan-1-one and phenyl ketone; benzoin; benzoin ethers such as benzoin methyl ether; benzophenones such as benzophenone, 4-phenyl benzophenone; thioxanthones such as 2-isopropylthioxanthone and 2,4-dimethylthioxanthone; and azides such as benzoic acid 3-sulfonylazide and benzoic acid 4-sulfonylazide.

A crosslinking aid can be used together for the crosslinking reaction. Non-limiting examples of the crosslinking aid are ethylene glycol diacrylate, ethylene glycol dimethacrylate, oligoethylene glycol diacrylate, oligoethylene glycol dimethacrylate, trimethylol propane triacrylate, trimethylolpropane trimethacrylate, allyl methacrylate, allyl acrylate, diallyl maleate, triallylisocyanurate, maleimide, phenyl maleimide and maleic anhydride.

The crosslinking agent containing silicon hydride is preferably a compound containing at least two silicon hydrides. Chain or cyclic polysiloxane compounds and polysilane compounds are preferable.

Examples of the catalyst of the hydrosilylation reaction include transition metals such as palladium and platinum or a compound or complex thereof. Furthermore, peroxide, amine and phosphine can also be used. The most popular catalyst includes dichlorobis(acetonitrile)palladium (II), chlorotris(triphenylphosphine)rhodium (I) and chloroplatinic acid.

The polyether polymer having the reactive silicon group used in the present invention can be crosslinked by the reaction between the reactive silicon group and water. In order to increase the reactivity, there may be used, as a catalyst, organometal compounds, for example, tin compounds such as dibutyltin dilaurate, dibutyltin maleate, dibutyltin diacetate, tin octylate and dibutyltin acetylacetonate; titanium compounds such as tetrabutyl titanate and tetrapropyl titanate; aluminum compounds such as aluminum trisacetyl acetonate, aluminum trisethyl acetoacetate and diisopropoxyaluminum ethyl acetoacetate; or amine compounds such as butylamine, octylamine, laurylamine, dibutylamine, monoethanolamine, diethanolamine, triethanolamine, diethylenetriamine, trietylenetetraamine, cyclohexylamine, benzylamine, diethylaminopropylamine, guanine and diphenylguanine.

The polyether polymer having the epoxy group at the side chain used in the present invention can be crosslinked by the reaction with polyamines, acid anhydrides and the like.

Examples of the polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine and dihydrazide isophthalate; and aromatic polyamines such as 4,4'-diaminodiphenyl ether, diaminodiphenyl sulfone, m-phenylenediamine, 2,4-toluylenediamine, m-toluylenediamine, o-toluylenediamine and xylylenediamine. The amount of the polyamine varies depending on the type of the polyamine, but is usually in the range from 0.1 to 10% by weight based on the whole separation membrane excluding branched-chain ether compound.

Examples of the acid anhydrides includes maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride and trimellitic anhydride. The amount of the acid anhydrides varies depending on the type of the acid anhydride, but is usually in the range from 0.1 to 10% by weight based on whole separation membrane excluding branched-chain ether compound. In the crosslinking, an accelerator can be used. In the crosslinking reaction of polyamines, examples of the accelerator include phenol, cresol, resorcin, pyrogallol, nonyl phenol and 2,4,6-tris(dimethylaminomethyl)phenol. In the crosslinking reaction of the acid anhydride, examples of the accelerator include benzyldimethylamine, 2,4,6-tris(dimethylaminomethyl)phenol, 2-(dimethylaminoethyl)phenol, dimethylaniline and 2-ethyl-4-methylimidazole. The amount of the accelerator varies depending on the type of the accelerator, but is usually in the range of 0.1 to 10% by weight based on the crosslinking agent.

The polyether polymer having the halogen atom-containing alkyl group used in the present invention can be crosslinked by the reaction with polyamines, mercaptoimidazolines, mercaptopyrimidines, thioureas, polymercaptans or the like.

Examples of the polyamine include triethylenetetramine and hexamethylenediamine. Examples of the mercaptoimidazoline include 2-mercaptoimidazoline and 4-methyl-2-mercaptoimidazoline. Examples of the mercaptopyrimidine include 2-mercaptopyrimidine and 4,6-dimethyl-2-mercaptopyrimidine. Examples of the thiourea include ethylenethiourea and dibutylthiourea. Examples of the polymercaptan include 2-dibutylamino-4,6-dimercapto-s-triazine and 2-phenylamino-4,6-dimercaptotriazine. The amount of the crosslinking agent to be added may vary depending on the type of the crosslinking agent, but is usually in the range of 0.1 to 30% by weight based on the whole separation membrane excluding branched-chain ether compound.

Generally, the separation membrane is preferably a crosslinked material in view of the mechanical strength, the handling properties, the heat resistance, the durability and the solvent resistance of the membrane, but the separation membrane is not necessarily limited to the crosslinked material. For example, when the polymer separation membrane itself is not required to have high strength as in the case that the membrane is combined with a metal substrate, an inorganic substrate or an organic polymer porous substrate, or when a gas mixture contains very small amount of a polar solvent such as water, a lower alcohol, acetonitrile, N-methyl-2-pyrrolidone, methyl ethyl ketone and ethyl acetate, the uncrosslinked material can be used.

Furthermore, it is effective to add a metal compound acting as an acid acceptor to the separation membrane in view of the thermal stability of the halogen-containing polymer. Examples of the metal oxide as the acid acceptor include oxide, hydroxide, carbonate salt, carboxylate salt, silicate salt, borate salt and phosphite salt of Group II metal of the periodic table; and oxide, basic carbonate salt, basic carboxylate salt, basic phosphite salt, basic sulfite salt and tribasic sulfate salt of Group VIa metal of the periodic table. Specific examples thereof include magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc white, tin oxide, litharge, read lead, white lead, dibasic lead phthalate, dibasic lead carbonate, tin stearate, basic lead phosphite, basic tin phosphite, basic lead sulfite and tribasic lead sulfate. The amount of the metal compound acting as the above acid acceptor varies depending on the type thereof, but is usually in the range from 0.1 to 30% by weight based on the whole composition excluding a branched-chain ether compound.

A liquid component, an electrolyte salt compound and the like can be added for the purpose of increasing the flexibility of the separation membrane of the present invention. The electrolyte salt compound may be anyone so long the electrolyte salt compound is dissolved in the polymer or the crosslinked material thereof according to the present invention. Preferably, the following electrolyte salt compounds are used.

That is, examples of the electrolyte salt compound include a compound composed of a cation selected from metal cation, ammonium ion, amidinium ion and guanidium ion, and an anion selected from chloride ion, bromide ion, iodide ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $X^1SO_3^-$, $[(X^1SO_2)(X^2SO_2)N]^-$, $[(X^1SO_2)(X^2SO_2)(X^3SO_2)C]^-$ and $[(X^1SO_2)(X^2SO_2)YC]^-$, wherein $X^1$, $X^2$, $X^3$ and Y respectively represent an electron attractive group. Preferably, $X^1$, $X^2$ and $X^3$ independently represent a perfluoroalkyl having 1 to 6 carbon atoms or a perfluoroaryl group and Y represents a nitro group, a nitroso group, a carbonyl group, a carboxyl group, a cyano group or a trialkylammonium group. The amount of the electrolyte salt compound is so amount that a numeral value of a molar ratio of the number of moles of the electrolyte salt compound to the total number of moles of ether oxygen atom in the main and side chains of the polyether polymer and moles of oxygen atom in the branched-chain ether compound, that is, the ratio: (the number of moles of the electrolyte salt compound)/(the total number of moles of ether oxygen atom contained in the polyether polymer and oxygen atom contained in the branched-chain ether compound) is preferably within the range from 0.0001 to 5, more preferably from 0.001 to 1.0. Within this value range, the processability and moldability, the mechanical strength and flexibility of the resultant separation membrane are good.

The branched-chain ether compound mixed with the polyether polymer has lower volatility than conventionally used linear ether, for example, dimethyl ether, diethyl ether, diethyleneglycoldimethyl ether diethyleneglycoldimethyl ether. Since a linear polyethylene glycol having low volatility and the molecular weight of at least 500 has a crystalline melting point of about 60° C. and the membrane structure is easily changed due to the heat history below said temperature, the separation membrane comprising the linear polyethylene glycol has low stability. Since the branched-chain ether compound is characterized in that the branched-chain ether compound has the same volatility but difficult crystallization in comparison with the linear ether compound having the same molecular weight, the separation membrane comprising the branched-chain polyether compound has remarkably improved solvent retention and excellent stability for long term.

When the separation membrane contains the branched-chain ether compound, an amount ratio of the polyether polymer to the branched-chain ether compound is arbitrary, but, usually, the branched-chain ether compound is preferably from 1 to 400 parts by weight, for example, from 5 to 50 parts by weight, per 100 parts by weight of the polyether polymer, in view of the mechanical strength and the stability of the separation membrane.

A method of producing the gas separation membrane of the present invention is not limited, and usually the polyether polymer (A) and the optionally present electrolyte salt compound (B) can be mixed mechanically. In the case of the polymer requiring the crosslinking, for example, respective components are mechanically mixed and then crosslinked. Alternatively, the polyether polymer (A) may be crosslinked and then immersed in an organic solvent containing the electrolyte salt compound (B) for a long time so that the polyether polymer is impregnated with the electrolyte salt compound (B). Various kneaders, open rolls, extruders and the like can be arbitrarily used as a mechanically mixing means. When a radical initiator is used in the crosslinking reaction of the ethylenically unsaturated group, the crosslinking reaction is completed within the range of 1 minute to 20 hours under the condition of the temperature of 10° C. to 200° C. When an energy ray such as an ultraviolet ray is used, a sensitizer is generally used. Usually, the crosslinking reaction can be completed within the range of 0.1 seconds to 1 hour under the condition of the temperature of 10° C. to 150° C. In the crosslinking reaction of the reactive silicon-containing group, the amount of water used for the reaction is not limited because the reaction easily caused also by moisture. In the crosslinking reaction of the epoxy group, when a polyamine or an anhydride is used, the crosslinking reaction can be completed within the range of 10 minutes to 20 hours under the condition of the temperature of 10° C. to 200° C.

A method of mixing the electrolyte salt compound (B) with the polyether polymer (A) is not specifically limited. Mentioned are a method of immersing the polyether polymer into an organic solvent containing the electrolyte salt compound (B) for a long time to conduct the impregnation; a method of mechanically mixing the electrolyte salt compound (B) with the polyether polymer (A); a method of dissolving the polyether compound (A) and the electrolyte salt compound (B) into organic solvents and mixing them; a method of dissolving the polyether polymer (A) into a solvent, and then mixing the solution with the electrolyte salt compound (B). The organic solvent used for the mixing is removed after the membrane formation.

A method of producing the gas separation membrane containing the branched-chain ether compound is not limited, and usually the polyether polymer (A), the optionally present electrolyte salt compound (B) and the branched-chain ether compound (C) can be mixed mechanically. In the case of the polymer requiring the crosslinking, for example, respective components are mechanically mixed and then crosslinked. Alternatively, the polyether polymer (A) may be crosslinked and immersed in an organic solvent containing the electrolyte salt compound (B) and the branched-chain ether compound (C) for a long time so that the polyether polymer is impregnated with the electrolyte salt compound (B) and the branched-chain ether compound (C). Various kneaders, open rolls, extruders and the like can be arbitrarily used as a mechanically mixing means. When a radical initiator is used in the crosslinking reaction of the ethylenically unsaturated group, the crosslinking reaction is completed within the range of 1 minute to 20 hours under the condition of the temperature of 10° C. to 200° C. When an energy ray such as an ultraviolet ray is used, a sensitizer is generally used. Usually, the crosslinking reaction can be completed within the range of 0.1 seconds to 1 hour under the condition of the temperature of 10° C. to 150° C. In the crosslinking reaction of the reactive silicon-containing group, the amount of water used for the reaction is not limited because the reaction easily caused also by moisture. In the crosslinking reaction of the epoxy group, when a polyamine or an anhydride is used, the crosslinking reaction can be completed within the range of 10 minutes to 20 hours under the condition of the temperature of 10° C. to 200° C.

A method of mixing the optionally present electrolyte salt compound (B) and the branched-chain ether compound (C) with the polyether polymer (A) is not specifically limited. Mentioned are a method of immersing the polyether polymer into an organic solvent containing the electrolyte salt compound (B) and the branched-chain ether compound (C) for a long time to conduct the impregnation; a method of mechanically mixing the electrolyte salt compound (B) and the branched-chain ether compound (C) with the polyether polymer (A); a method of dissolving the polyether compound (A) the electrolyte salt compound (B) and the branched-chain ether compound (C) into organic solvents and mixing them; a method of dissolving the polyether polymer (A) into a solvent, and then mixing the solution with the electrolyte salt compound (B) and the branched-chain ether compound (C). The organic solvent used for the mixing is removed after the membrane formation.

The thickness of the gas separation membrane of the present invention is, for example, from 0.1 $\mu$m to 500 $\mu$m, particularly from 0.5 $\mu$m to 100 $\mu$m.

Since the gas separation membrane of the present invention is excellent in permeation of particularly carbon dioxide gas or various hydrocarbon gases, it is suitable as the gas separation membrane separating the carbon dioxide gas from a carbon dioxide-containing gas mixture, for example, a mixture gas comprising the carbon dioxide gas and a nitrogen gas, air or the like, or separating the carbon dioxide gas from a mixture gas comprising the carbon dioxide gas and a hydrogen gas or the like, and as the polymeric gas separation membrane separating the hydrocarbon gas from a mixture gas containing the hydrocarbon gas.

The gas separation membrane of the present invention is excellent in mechanical strength and flexibility and the gas separation membrane in the form of a thin film can be easily obtained. The separation membrane of the present invention has higher permeation coefficient and higher ratio of permeation coefficient than conventional separation membranes and can remarkably efficiently separate and recover an object gas.

PREFERRED EMBODIMENTS

The present invention is illustrated with examples hereinafter.

SYNTHETIC EXAMPLE 1
<Synthesis of Polyether Copolymer (I)>

3 L glass four-necked flask was replaced with nitrogen, an organic tin-phosphate ester condensate, as the catalyst, prepared by heating tributyltin chloride (0.1 g) and tributyl phosphate (0.3 g) at 250° C. for 20 minutes, 45 g of 2-(2-methoxyethoxy)ethyl glycidyl ether (EM-2) adjusted to the water content of at most 10 ppm, 25 g of allyl glycidyl ether (AGE) and 2,000 g of hexane as solvent were charged into the flask. 330 g of ethylene oxide (EO) was gradually added while monitoring a polymerization rate of the glycidyl ether compound by gas chromatography. The polymerization reaction was terminated by methanol. After the product was removed by decantation, the product was dried at reduced pressure at 40° C. for 24 hours to give 340 g of a polyether copolymer (I). This copolymer had a composition in terms of monomers determined by $^1$H-NMR spectrum of EO:EM-2:AGE=94:4:2 (% by mol), a weight-average molecular weight determined by gel permeation chromatography of 2,400,000 in terms of standard polystyrene, and a heat of fusion of crystal determined by DSC of 78 J/g.

SYNTHETIC EXAMPLE 2
<Synthesis of Polyether Copolymer (II)>

The same procedure as in Synthetic Example 1, except that 100 g of propylene oxide (PO) and 275 g of EO were used instead of 45 g of EM-2 and 330 g of EO, was repeated to give 370 g of a polyether copolymer (II). This copolymer had a composition in terms of monomers of EO:PO:AGE= 83:16:1 (% by mol), a weight-average molecular weight of 2,700,000, and a heat of fusion of crystal of 25 J/g.

SYNTHETIC EXAMPLE 3
<Synthesis of Polyether Copolymer (III)>

The same procedure as in Synthetic Example 1, except that 150 g of epichlorohydrin (EP), 30 g of AGE and 220 g of EO were used instead of 45 g of EM-2, 25 g of AGE and 330 g of EO, was repeated to give 370 g of a polyether copolymer (III). This copolymer had a composition in terms of monomers of EO:EP:AGE=56:39:5 (% by mol), a weight-average molecular weight of 1,400,000, and a heat of fusion of crystal of 2 J/g.

SYNTHETIC EXAMPLES 4 TO 9
<Synthesis of Polyether Copolymers (IV) to (IX)>

The same procedure as in Synthetic Example 1, using monomers selected from EO, EM-2, PO, EP, AGE and 3-glycidoxypropyltrimethoxysilane (GPTMS), was repeated to give polyether copolymers (IV) to (IX). The compositions in terms of monomers of the polyether copolymers (IV) to (IX) were as follows:

Polyether copolymer (IV): PO/EP/GPTMS=35/63/2
Polyether copolymer (V): EO/AGE=92/8
Polyether copolymer (VI): EP/AGE=94/6
Polyether copolymer (VII): EO/GPTMS=95/5
Polyether copolymer (VIII): EO/PO=90/10
Polyether copolymer (IX): EO/EM-2=78/22

The polyether copolymers (IV) to (IX) had weight-average molecular weights of 450,000 to 2,550,000 and heats of fusion of crystal of 11 J/g to 85 J/g.

EXAMPLE 1
<Preparation of Gas Separation Membrane>

20 g of the polyether copolymer (I), 1.0 g of diethylene glycol dimethacrylate (BLEMER PDE-100, manufactured by NOF Corp.) as a crosslinking agent, 0.20 g of benzoyl peroxide and 100 g of acetonitrile were mixed to homogeneity. This mixture liquid was degassed under vacuum for 10 minutes, cast on a polytetrafluoroethylene mold, made free of the solvent, and then heated at 80° C. for 3 hours in an inert gas atmosphere to give a membrane having a thickness of about 0.050 mm. This membrane was punched to give a disc having a diameter of 60 mm, the disc was installed in a gas permeability measurement cell to measure a permeation coefficient of each of a hydrogen gas ($H_2$), a carbon dioxide gas ($CO_2$), a nitrogen gas ($N_2$), a propane gas ($C_3H_8$) and 1,3-butadiene gas ($C_4H_6$).

The gas permeation coefficient was determined by installing the membrane in a stainless cell having a membrane area of 18.86 cm$^2$, supplying a gas at pressure of 1 to 5 kg/cm$^2$, reducing a pressure of a permeation side, detecting the amount of a gas penetrating the membrane at 25° C. or 35° C. by a pressure sensor and calculating a permeation coefficient of each gas according to the following formula. A ratio of permeation coefficient was shown by a rate of permeation coefficients of respective gases.

$$\text{Gas permeation coefficient} = \frac{[(\text{amount of gas penetration}) \times (\text{membrane thickness})]}{[(\text{membrane area}) \times (\text{penetration time}) \times (\text{pressure difference})]}$$

The permeability of a mixture gas of a carbon dioxide gas and a nitrogen gas was determined by analyzing the composition of the gas penetrating through the membrane by gas chromatography.

The gas permeation coefficient and the ratio of permeation coefficient measuring by using the membrane made from polyether copolymer (I), and the ratio of permeation coefficient after successive gas penetration for one week are shown in Table 1.

EXAMPLE 2

The same procedure as in Example 1, except that the polyether copolymer (II) was used instead of the polyether copolymer (I) in Example 1, was repeated to give a membrane. A gas permeation coefficient and a ratio of permeation coefficient measured by using the resultant membrane are shown in Table 1.

EXAMPLE 3

The same procedure as in Example 1, except that the polyether copolymer (III) was used instead of the polyether copolymer (I) in Example 1, was repeated to give a membrane. A gas permeation coefficient and a ratio of permeation coefficient measured by using the resultant membrane are shown in Table 1.

EXAMPLES 4 TO 7

The same procedure as in Example 1, except that the polyether copolymers (IV) to (VII) were used instead of the polyether copolymer (I) in Example 1, was repeated to give a membrane. A gas permeation coefficient and a ratio of permeation coefficient measured by using the resultant membrane are shown in Table 1.

EXAMPLE 8

20 g of the polyether copolymer (VIII) and 100 g of acetonitrile were mixed to homogeneity. This mixture liquid was degassed under vacuum for 10 minutes and cast on porous polyethylene film having a thickness of 20 μm, and the solvent was removed off to give a membrane. This membrane was punched to give a disc having a diameter of 60 mm and installed in a cell for measuring gas permeability. Permeation coefficients of various gases were measured. Gas permeation coefficients and ratios of permeation coefficient measured by using the resultant membrane are shown in Table 1.

EXAMPLE 9

The same procedure as in Example 8, except that the polyether copolymer (IX) was used instead of the polyether copolymer (VIII) in Example 8, was repeated to give a membrane. A gas permeation coefficient and a ratio of permeation coefficient measured by using the resultant membrane are shown in Table 1.

COMPARATIVE EXAMPLE 2

The same procedure as in Example 8, except that PEO having a weight-average molecular weight of 4,000 and a heat of fusion having 180 J/g was used instead of the polyether copolymer (VIII) in Example 8, was repeated to give a membrane. A gas permeation coefficient and a ratio of permeation coefficient measured by using the resultant membrane are shown in Table 1. The measurement could not be conducted after one week, since the impregnated membrane was mechanically unstable.

COMPARATIVE EXAMPLE 3

A gas permeation coefficient and a ratio of permeation coefficient measured by using a polysulfone resin membrane (PSR) used instead of the polyether copolymer (I) membrane in Example 1 are shown in Table 1.

TABLE 1

| | Membrane | Measurement temperature (°C.) | Permeation coefficient | | | | | Ratio of permeation coefficient | | | | |
|---|---|---|---|---|---|---|---|---|---|---|---|---|
| | | | $H_2$ | $CO_2$ | $N_2$ | $C_3H_8$ | $C_4H_6$[1] | $CO_2/N_2$ | $CO_2/H_2$ | $C_3H_8/H_2$ | $C_4H_6/H_2$ | $CO_2/N_2$* |
| Ex. 1 | Crosslinked EO/EM-2/AGE | 25 | 20 | 250 | 4 | 180 | 1540 | 63(80) | 13 | 9 | 77 | 63 |
| | | 35 | 30 | 300 | 6 | 230 | 1510 | 50(60) | 10 | 8 | 50 | — |
| Ex. 2 | Crosslinked EO/PO/AGE | 35 | 30 | 220 | 5 | 150 | — | 40 | 7 | 5 | — | 40 |
| Ex. 3 | Crosslinked EO/EP/AGE | 35 | 30 | 260 | 6 | 160 | 1400 | 43 | 9 | 5 | 47 | 43 |
| Ex. 4 | Crosslinked PO/EP/GPTMS | 35 | 30 | 270 | 6 | — | — | 45 | 9 | — | — | 45 |
| Ex. 5 | Crosslinked EO/AGE | 25 | 30 | 350 | 5 | 350 | 2400 | 70 | 12 | 12 | 80 | 70 |
| | | 35 | 40 | 400 | 7 | 400 | 2800 | 57 | 10 | 10 | 70 | — |
| Ex. 6 | Crosslinked EP/AGE | 35 | 20 | 250 | 6 | 160 | — | 42 | 13 | 8 | — | 42 |
| Ex. 7 | Crosslinked EO/GPTMS | 35 | 40 | 380 | 6 | 370 | 2500 | 63 | 10 | 9 | 63 | 63 |
| Ex. 8 | Crosslinked EO/PO | 35 | 45 | 400 | 6 | — | — | 67 | 9 | — | — | 64 |
| Ex. 9 | Crosslinked EO/EM-2 | 25 | 38 | 610 | 7 | — | — | 87 | 16 | — | — | — |
| | | 35 | 60 | 810 | 12 | — | — | 68 | 14 | — | — | 62 |
| Com. Ex. 1 | PEO | 35 | 10 | 100 | 2 | 90 | 140 | 50 | 10 | 9 | 14 | — |
| Com. Ex. 2 | PEO | 35 | 10 | 100 | 2 | 100 | 200 | 50 | 10 | 10 | 20 | —** |
| Com. Ex. 3 | PSR | 35 | 14 | 5.6 | 1.4 | 0.02 | — | 4 | 0.4 | 0.001 | — | 2 |

Note:
[1]$C_4H_6$: 1,3-Butadiene
Permeation coefficient in $10^{-10}$ cm$^3$ (STP) cm cm$^{-2}$ s$^{-1}$ cm Hg$^{-1}$
Ratio of permeation coefficient: parentheses show the result of mixture gas
*Ratio of permeation coefficient after the gas penetration is conducted successively for one week
**Not detectable

COMPARATIVE EXAMPLE 1

The same procedure as in Example 8, except that the polyethylene oxide (PEO) having a weight-average molecular weight of 3,500,000 and a heat of fusion having 172 J/g was used instead of the polyether copolymer (VIII) in Example 8, was repeated to give a membrane. A gas per-

SYNTHETIC EXAMPLE 10
<Synthesis of Polyether Copolymer (A)>

3 L glass four-necked flask was replaced with nitrogen, an organic tin-phosphate ester condensate, as the catalyst, prepared by heating tributyltin chloride (0.1 g) and tributyl phosphate (0.3 g) at 250° C. for 20 minutes, 130 g of 2-(2-methoxyethoxy)ethyl glycidyl ether (EM-2) adjusted to the water content of at most 10 ppm, 15 g of allyl glycidyl ether (AGE) and 2,000 g of hexane as solvent were charged into the flask. 190 g of ethylene oxide (EO) was gradually added while monitoring a polymerization rate of the glycidyl ether compound by gas chromatography. The polymerization reaction was terminated by methanol. After the product was removed by decantation, the product was dried at reduced pressure at 40° C. for 24 hours to give 320 g of a polyether copolymer (A). This copolymer had a composition in terms of monomers determined by $^1$H-NMR spectrum of EO:EM-2:AGE=84:14:2 (% by mol), a weight-average molecular weight determined by gel permeation chromatography of 2,200,000 in terms of standard polystyrene, and a heat of fusion determined by DSC of 6 J/g.

SYNTHETIC EXAMPLE 11
<Synthesis of Polyether Copolymer (B)>

The same procedure as in Synthetic Example 10 was used except that 80 g of epichlorohydrin (EP), 40 g of AGE and 260 g of EO were used instead of 130 g of EM-2, 15 g of AGE and 190 g of EO in Synthesis Example 10, to give 370 g of a polyether copolymer (C). This copolymer had a composition in terms of monomers of EO:EP:AGE= 83:12:5% by mol, a weight-average molecular weight of 1,400,00, and a heat of fusion of crystal of 12 J/g.

SYNTHETIC EXAMPLES 12 TO 14
<Synthesis of Polyether Copolymers (C) and (D)>

The same procedure as in Synthetic Example 10 was repeated by using monomers selected from EO, EM-2 and AGE to give polyether copolymers (C) and (D).

Polyether copolymer (C): EO/AGE=92/8
Polyether copolymer (D): EO/EM-2=78/22

The polyether copolymers (C) and (D) had weight-average molecular weights of 2,200,000 and 800,000, respectively, and heats of fusion of crystal of 85 J/g and 8 J/g, respectively.

SYNTHETIC EXAMPLE 15
<Synthesis of Branched-Chain Ether Compound (E)>
(Step 1)

44.0 g (1.1 mol) of NaOH pellets were added to 360 g (3.0 mol) of diethyleneglycol monomethyl ether, and 176 g (1.0 mol) of 2-(2-methoxyethoxy)ethyl glycidyl ether was gradually dropwise added while stirring at 70° C. After the completion of dropwise addition, the mixture was stirred for about one hour and then stood for cooling at room temperature. Then, the mixture was neutralized with hydrochloric acid, a precipitated salt was filtered off and the liquid was condensed. The liquid was purified by vacuum distillation to give 222 g of 1,3-bis[2-(2-methoxyethoxy)ethoxy]-2-propanol (yield: 75%). The distillation temperature was from 171 to 175° C./0.8 mmHg.

(Step 2)

20.4 g (0.51 mol) of NaOH pellets were added to 100 g (0.34 mol) of 1,3-bis[2-(2-methoxyethoxy)ethoxy]-2-propanol resulting from Step 1. 48.2 g (0.51 mol) of 2-chloroethylmethylether was dropwise added in small portions while stirring at 60° C. After the completion of dropwise addition, the mixture was stirred for about 2 hours and a precipitated salt was filtered off, the filtrate was condensed and purified by a vacuum distillation to give 102 g of 1,3-bis[2-(2-methoxyethoxy)ethoxy]-2-(2-methoxyethoxy)propane (E) (yield: 85%). The distillation temperature was from 155 to 161° C./0.2 mmHg.

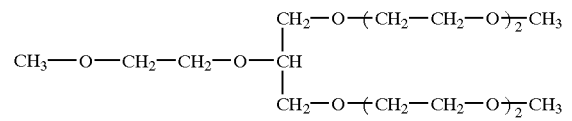

(E)

SYNTHETIC EXAMPLE 16
<Synthesis of Branched-Chain Ether Compound (F)>

96 g (2.4 mol) of NaOH pellets were added to 69 g (0.5 mol) of pentaerythritol, and 189 g (2.0 mol) of 2-chloroethylmethylether was dropwise added in small portions while stirring at 70° C. After the completion of dropwise addition, the mixture was stirred for about 2 hours and stood for cooling at room temperature. A precipitated salt was filtered off, the filtrate was condensed and purified by a vacuum distillation to give 35.4 g of the compound having the formula (F) (yield: 24%). The distillation temperature was 140° C./0.2 mmHg.

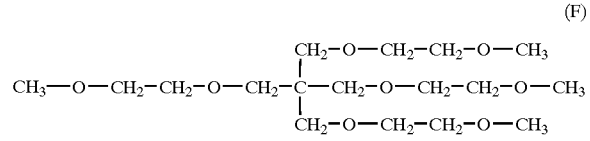

(F)

SYNTHETIC EXAMPLE 17
<Synthesis of Branched-Chain Ether Compound (G)>

9.6 g (0.24 mol) of NaOH pellets were added to 100 g (0.48 mol) of 1,3-bis (2-methoxyethoxy)-2-propanol resulting from the same procedure as in Step 1 in Synthetic Example 10, and 11.4 g (0.08 mol) of bis(2-chloroethyl) ether was dropwise added in small portions while stirring at 70° C. After the completion of dropwise addition, the mixture was stirred for about 2 hours and stood for cooling at room temperature. A precipitated salt was filtered off, the filtrate was condensed and low-boiling-point materials were removed under a low pressure, to give 31.2 g of the compound having the formula (G) (yield: 80%).

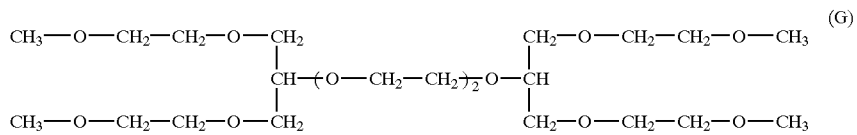

(G)

EXAMPLE 10
<Preparation of Gas Separation Membrane>

20 g of the polyether copolymer (A), 5 g of the branched-chain ether compound (E), 1.0 g of diethylene glycol dimethacrylate (BLEMER PDE-100 manufactured by NOF Corp.) as a crosslinking agent, 0.20 g of benzoylperoxide and 100 g of acetonitrile were mixed to give a homogeneous mixture. This mixture liquid was degassed under vacuum for 10 minutes and cast on a polytetrafluoroethylene mold, and a solvent was removed. Then, the mixture was heated at 80° C. for 3 hours in inert atmosphere to give a membrane having the thickness of about 60 μm. This membrane was punched to give a disc having the diameter of 60 mm. The disc was installed in a gas permeation measurement cell to measure a permeation coefficient of each of a hydrogen gas ($H_2$), a carbon dioxide gas ($CO_2$), a nitrogen gas ($N_2$), a propane gas ($C_3H_8$) and a 1,3-butadiene gas ($C_4H_6$).

The gas permeation coefficient was determined by installing the membrane in a stainless steel cell having a membrane area of 18.86 cm$^2$, supplying a gas at a pressure of 1 to 5 kg/cm$^2$ with decreasing the pressure of permeation side and detecting the amount of the gas transmitting through the membrane at 35° C. by a pressure sensor, then the permeation coefficient of each gas was calculated. A ratio of permeation coefficient was expressed by a ratio of permeation coefficient of gases.

EXAMPLE 11

The same procedure as in Example 10 was repeated, except that the branched-chain ether compound (F) was used instead of the branched-chain ether compound (E) in Example 10, to give a membrane. The gas permeation coefficient and the ratio of permeation coefficient measured by using the resultant membrane are shown in Table 2.

EXAMPLE 12

The same procedure as in Example 10 was repeated, except that the branched-chain ether compound (G) was used instead of the branched-chain ether compound (E) in Example 10, to give a membrane. The gas permeation coefficient and the ratio of permeation coefficient measured by using the resultant membrane are shown in Table 2.

EXAMPLES 13 TO 21

The same procedure as in Example 10 was repeated, by using the polyether copolymers (B), (C) and (D) and the branched-chain ether compounds (E) to (G), to give membranes. In the case of non-crosslink, none of the crosslinking agent and peroxide were used.

The gas permeation coefficient and the ratio of permeation coefficient measured by using the resultant membrane are shown in Table 2.

TABLE 2

| | Membrane | | Measurement temp. (° C.) | Permeation coefficient | | | | | Ratio of permeation coefficient | | | | |
|---|---|---|---|---|---|---|---|---|---|---|---|---|---|
| | | | | | | | | $C_4H_6$ | | | | | |
| Polymer | branched-chain ether | Crosslink | | $H_2$ | $CO_2$ | $N_2$ | $C_3H_8$ | Note | $CO_2/N_2$ | $CO_2/H_2$ | $C_3H_8/H_2$ | $C_4H_6/H_2$ | $CO_2/N_2*$ |
| Ex. 10 | A | E | Crosslinked | 35 | 53 | 610 | 15 | 490 | 3300 | 42 | 12 | 9.2 | 62 | 44 |
| Ex. 11 | A | F | Crosslinked | 35 | 60 | 700 | 16 | 520 | 3800 | 44 | 12 | 8.7 | 63 | 46 |
| Ex. 12 | A | G | Crosslinked | 35 | 55 | 680 | 16 | 510 | 3000 | 43 | 12 | 9.3 | 55 | 45 |
| Ex. 13 | B | E | Crosslinked | 35 | 63 | 560 | 11 | 350 | — | 51 | 8.9 | 5.6 | — | — |
| Ex. 14 | B | F | Crosslinked | 35 | 64 | 600 | 11 | 400 | — | 55 | 9.4 | 6.3 | — | — |
| Ex. 15 | B | G | Crosslinked | 35 | 62 | 540 | 11 | 350 | — | 49 | 8.7 | 5.6 | — | — |
| Ex. 16 | C | E | Crosslinked | 35 | 38 | 440 | 7.0 | 450 | 3000 | 63 | 12 | 12 | 79 | 63 |
| Ex. 17 | C | F | Crosslinked | 35 | 39 | 470 | 7.6 | 480 | 3500 | 62 | 12 | 12 | 90 | 63 |
| Ex. 18 | C | G | Crosslinked | 35 | 38 | 480 | 7.4 | 450 | 3400 | 65 | 13 | 12 | 89 | 65 |
| Ex. 19 | D | E | Non-crosslinked | 35 | 61 | 890 | 13 | — | — | 68 | 15 | — | — | — |
| Ex. 20 | D | F | Non-Crosslinked | 35 | 61 | 920 | 14 | — | — | 68 | 15 | — | — | — |
| Ex. 21 | D | G | Non-Crosslinked | 35 | 62 | 900 | 13 | — | — | 69 | 15 | — | — | — |

Note) $C_4H_6$: 1,3-Butadiene

EFFECTS OF THE INVENTION

The gas separation membrane of the present invention is excellent in processability, shapability, mechanical strength and thermal resistance and the like, and has significantly improved separability. Accordingly, the membrane can be used as a gas separation membrane which is needed to separate, particularly, carbon dioxide gas and hydrocarbon gas in good efficiency.

The gas separation membrane of the present invention can separate carbon dioxide gas from carbon dioxide-containing gas mixture, for example, mixture gas containing carbon dioxide gas and nitrogen gas and/or air and/or hydrogen gas and the like, and further can be separate hydrocarbon gas from hydrocarbon-containing gas mixture, that is, mixture gas containing hydrocarbon gas and other gases (for example, nitrogen gas and/or air and/or hydrogen gas).

What is claimed is:

1. A separation membrane comprising a polyether polymer having a weight-average molecular weight of $10^4$ to $10^7$ and obtained by polymerizing an oxirane compound of the formula:

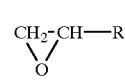

(a)

wherein R is a hydrogen atom;
an alkyl group, an alkyl group having an halogen atom, or —$CH_2O(CH_2CH_2O)_k$—R' where R' is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atom; k is from 0 to 12; or an ethylenically unsaturated group, a reactive silicon-containing group or a methylepoxy-containing group.

2. The separation membrane according to claim 1, wherein the monomers constituting the polyether polymer are:

(i) a combination of the monomers (1) and (2),
(ii) a combination of the monomers (1) and (3),
(iii) a combination of the monomers (1), (2) and (3), or
(iv) a combination of the monomers (2) and (3),

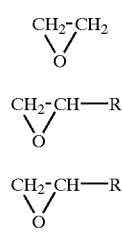

(1)
(2)
(3)

wherein, in the above formula (2), $R^1$ is an alkyl group, an alkyl group containing a halogen atom, or —$CH_2O(CH_2CH_2O)_k$—R', in the formula (3), $R^2$ is an ethylenically unsaturated group, a reactive silicon-containing group, a methylepoxy-containing group or an alkyl group having a halogen atom, provided that the monomer (2) and the monomer (3) are not the same compound.

3. The separation membrane according to claim 1, wherein said weight-average molecular weight of the polyether polymer is in the range of $10^5$ to $5 \times 10^6$.

4. The separation membrane according to claim 1, wherein R' is the alkyl group having 1 to 3 carbon atoms or the alkenyl group having 2 to 4 carbon atoms.

5. The separation membrane according to claim 1, wherein the oxirane compound is epibromohydrin, epi-iodohydrin or epichlorohydrin.

6. The separation membrane according to claim 1, wherein the oxirane compound is allyl glycidyl ether, allyl phenylglycidyl ether, vinyl glycidyl ether, 3,4-epoxy-1-butene, 3,4-epoxy-1-pentene, 4,5-epoxy-2-pentene, glycidyl acrylate or glycidyl methacrylate.

7. The separation membrane according to claim 1, wherein the oxirane compound is γ-glycidoxypropyltrimethoxysilane or γ-glycidoxypropylmethyldimethoxysilane.

8. The separation membrane according to claim 1, which separates carbon dioxide gas from mixture gas containing carbon dioxide gas, or hydrocarbon gas from mixture gas containing hydrocarbon gas.

9. The separation membrane according to claim 1, which separates carbon dioxide gas from mixture gas containing nitrogen gas and carbon dioxide gas, or from mixture gas containing hydrogen gas and carbon dioxide gas.

10. A separation membrane comprising a polyether polymer having a weight-average molecular weight of $10^4$ to $10^7$ and obtained by polymerizing an oxirane compound of the formula:

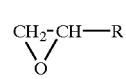

(a)

wherein R is a hydrogen atom;

an alkyl group, an alkyl group having a halogen atom, or —$CH_2O(CH_2CH_2O)_k$—R', where R' is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atoms; k is from 0 to 12; or an ethylenically unsaturated group, a reactive silicon-containing group or a methylepoxy-containing group, and a branched-chain ether compound exhibiting liquid properties at normal temperature and selected from the group consisting of the formulas (i), (ii) and (iii):

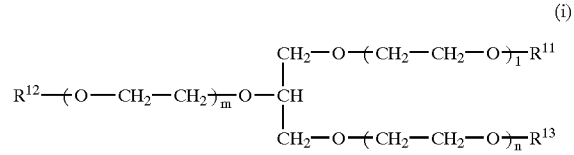

(i)

wherein $R^{11}$, $R^{12}$ and $R^{13}$ are a hydrogen atom, an alkyl group having 1 to 6 carbon atoms or an alkenyl group having 2 to 6 carbon atoms; l, m and n are from 0 to 12, provided that all of l, m and n are not simultaneously 0,

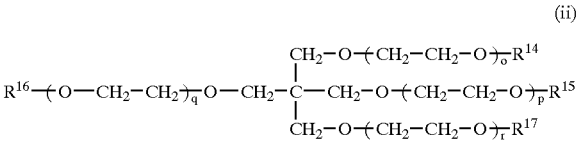

(ii)

wherein $R^{14}$, $R^{15}$, $R^{16}$ and $R^{17}$ are a hydrogen atom, an alkyl group having 1 to 6 carbon atoms or an alkenyl group having 2 to 6 carbon atoms; o, p, q and r are from 0 to 12, provided that all of o, p, q and r are not simultaneously 0,

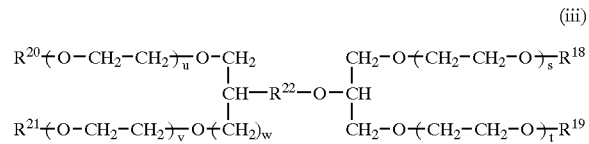

(iii)

wherein $R^{18}$, $R^{19}$, $R^{20}$ and $R^{21}$ are a hydrogen atom, an alkyl group having 1 to 6 carbon atoms or an alkenyl group having 2 to 6 carbon atoms; s, t, u and v are from 0 to 12, provided that s, t, u and v are not simultaneously 0; $R^{22}$ is a methylene group or —$(OCH_2CH_2)_x$, x is from 0 to 12 and w is 0 or 1.

* * * * *